(12) United States Patent
Mazumder et al.

(10) Patent No.: US 9,447,732 B2
(45) Date of Patent: *Sep. 20, 2016

(54) GAS TURBINE ANTI-ICING SYSTEM

(71) Applicant: General Electric Company, Schenectady, NY (US)

(72) Inventors: Indrajit Mazumder, Bangalore (IN); Rajarshi Saha, Bangalore (IN); Seyfettin Can Gulen, Niskayuna, NY (US); Sabarinath Devarajan, Bangalore (IN); Prashant Kumar, Bangalore (IN)

(73) Assignee: General Electric Company, Schenectady, NY (US)

(*) Notice: Subject to any disclaimer, the term of this patent is extended or adjusted under 35 U.S.C. 154(b) by 659 days.

This patent is subject to a terminal disclaimer.

(21) Appl. No.: 13/685,608

(22) Filed: Nov. 26, 2012

(65) Prior Publication Data

US 2014/0144124 A1 May 29, 2014

(51) Int. Cl.
| | |
|---|---|
| F02C 3/34 | (2006.01) |
| F02C 7/047 | (2006.01) |
| F02C 7/08 | (2006.01) |
| F02C 6/08 | (2006.01) |
| F04D 27/02 | (2006.01) |
| F02C 9/18 | (2006.01) |

(52) U.S. Cl.
CPC .................. *F02C 7/047* (2013.01); *F02C 3/34* (2013.01); *F02C 6/08* (2013.01); *F02C 7/08* (2013.01); *F02C 9/18* (2013.01); *F04D 27/0207* (2013.01); *F04D 27/0215* (2013.01)

(58) Field of Classification Search
CPC ............ F02C 3/34; F02C 7/047; F02C 7/08; F02C 6/08; F02C 9/18; F04D 27/0207; F04D 27/0215

See application file for complete search history.

(56) References Cited

U.S. PATENT DOCUMENTS

| | | | | |
|---|---|---|---|---|
| 3,621,654 A | * | 11/1971 | Hull | ............................. 60/39.15 |
| 3,842,597 A | | 10/1974 | Ehrich | |
| 3,996,738 A | * | 12/1976 | Justus | ............................. 60/791 |
| 4,099,375 A | | 7/1978 | Inglee | |

(Continued)

FOREIGN PATENT DOCUMENTS

| | | |
|---|---|---|
| CH | 701602 A2 | 2/2011 |
| CN | 101429891 A | 5/2009 |

(Continued)

OTHER PUBLICATIONS

U.S. Appl. No. 15/049,674, filed Feb. 22, 2016, Alston I. Scipio.

(Continued)

*Primary Examiner* — Phutthiwat Wongwian
*Assistant Examiner* — William Breazeal
(74) *Attorney, Agent, or Firm* — Fletcher Yoder P.C.

(57) ABSTRACT

Embodiments of the present disclosure are directed towards a system that includes a recirculation system. The recirculation system includes a compressor discharge air line extending from a compressor to an air intake. The compressor discharge air line is configured to flow a compressor discharge air flow, and the air intake is configured to supply an air flow to the compressor. An ejector is disposed along the compressor discharge air line between the compressor and the air intake. The ejector is configured to receive and mix the compressor discharge air flow and a turbine exhaust flow to form a first mixture.

24 Claims, 3 Drawing Sheets

(56) References Cited

U.S. PATENT DOCUMENTS

| | | | |
|---|---|---|---|
| 4,313,300 | A | 2/1982 | Wilkes et al. |
| 4,991,391 | A | 2/1991 | Kosinski |
| 5,307,619 | A | 5/1994 | McCarty et al. |
| 5,339,620 | A | 8/1994 | Ikeda et al. |
| 5,560,195 | A | 10/1996 | Anderson et al. |
| 5,794,431 | A | 8/1998 | Utamura et al. |
| 6,027,304 | A | 2/2000 | Arar et al. |
| 6,442,941 | B1 | 9/2002 | Anand et al. |
| 6,487,863 | B1 * | 12/2002 | Chen et al. ............... 60/782 |
| 6,779,346 | B2 | 8/2004 | Nichols et al. |
| 6,912,856 | B2 | 7/2005 | Morgan et al. |
| 7,100,356 | B2 | 9/2006 | Han et al. |
| 7,644,573 | B2 | 1/2010 | Smith et al. |
| 7,661,268 | B2 | 2/2010 | Althaus et al. |
| 8,056,318 | B2 | 11/2011 | Chillar et al. |
| 8,516,786 | B2 | 8/2013 | Zhang et al. |
| 8,844,258 | B2 * | 9/2014 | Ekanayake ......... F02C 7/047 60/39.093 |
| 9,297,316 | B2 | 3/2016 | Scipio et al. |
| 2002/0103547 | A1 | 8/2002 | Nomura et al. |
| 2004/0011051 | A1 | 1/2004 | Ryan et al. |
| 2004/0024516 | A1 | 2/2004 | Hook et al. |
| 2005/0107941 | A1 | 5/2005 | Healy |
| 2007/0074516 | A1 | 4/2007 | Peck et al. |
| 2007/0125092 | A1 | 6/2007 | Wolfe et al. |
| 2007/0137213 | A1 | 6/2007 | Rickert et al. |
| 2007/0271930 | A1 | 11/2007 | Takaoka et al. |
| 2009/0157230 | A1 | 6/2009 | Hibshman, II et al. |
| 2009/0205310 | A1 | 8/2009 | Hibshman, II et al. |
| 2009/0205334 | A1 * | 8/2009 | Aljabari et al. ......... 60/605.2 |
| 2009/0235634 | A1 | 9/2009 | Wang et al. |
| 2010/0058758 | A1 | 3/2010 | Gilchrist, III et al. |
| 2010/0101209 | A1 | 4/2010 | Feher et al. |
| 2010/0131169 | A1 | 5/2010 | Diantonio et al. |
| 2010/0146930 | A1 | 6/2010 | Motakef et al. |
| 2010/0146976 | A1 | 6/2010 | Motakef et al. |
| 2010/0205967 | A1 | 8/2010 | Gopalkrishna et al. |
| 2010/0215480 | A1 | 8/2010 | Leach et al. |
| 2010/0232945 | A1 * | 9/2010 | Zhang et al. ............. 415/177 |
| 2011/0058939 | A1 | 3/2011 | Orosa et al. |
| 2011/0162383 | A1 * | 7/2011 | Zhang et al. ............... 60/782 |
| 2011/0247313 | A1 * | 10/2011 | Chillar et al. ......... 60/39.093 |
| 2011/0289898 | A1 | 12/2011 | Hellat et al. |
| 2013/0125557 | A1 | 5/2013 | Scipio et al. |

FOREIGN PATENT DOCUMENTS

| | | |
|---|---|---|
| CN | 101672222 A | 3/2010 |
| EP | 2224114 A2 | 9/2010 |

OTHER PUBLICATIONS

CN First Office Action and English Translation; Application No. CN201210481490.2; Dated Jul. 14, 2015; 20 pages.

EP Extended Search Report; Application No. EP13186850.7; Dated Jan. 16, 2014; 6 pages.

Johnson et al.; "Speedtronic Mark V Gas Turbine Control System"; GE Industrial & Power Systems; Schenectady, NY (1996); 19 pages.

Rokke et al.; "Exhaust Gas Recirculation in Gas Turbines for Reduction of CO2 Emissions; Combustion Testing with Focus on Stability and Emissions"; Int. J. of Thermodynamics; vol. 8 (No. 4); Sep. 2005; pp. 167-173.

* cited by examiner

GAS TURBINE ANTI-ICING SYSTEM

BACKGROUND OF THE INVENTION

The subject matter disclosed herein relates to gas turbine systems, and, more particularly, to an anti-icing system for a gas turbine compressor.

Gas turbine systems generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft. The temperature of the air supplied to the air intake may affect the performance of the gas turbine system, particularly if the temperature is too low. Low temperature intake air may result in inlet icing, which can reduce the performance and reliability of the gas turbine system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a recirculation system. The recirculation system includes a compressor discharge air line configured to extend from a compressor to an air intake. The compressor discharge air line is configured to flow a compressor discharge air flow, and the air intake is configured to supply an air flow to the compressor. An ejector is disposed along the compressor discharge air line between the compressor and the air intake. The ejector is configured to receive and mix the compressor discharge air flow and a turbine exhaust flow to form a first mixture.

In a second embodiment, a gas turbine system includes a turbine configured to output a turbine exhaust flow, a combustor, and a compressor having an air intake. The air intake is configured to supply an air flow to the compressor. A first temperature sensor is configured to measure a temperature of the air flow to the compressor. The gas turbine system further includes a recirculation system having a compressor discharge air line extending from the compressor to the air intake with an ejector disposed along the compressor discharge air line between the compressor and the air intake. The ejector is configured to receive and mix a compressor discharge air flow from the compressor and the turbine exhaust flow from the turbine to form a first mixture. The ejector flows the first mixture to the air intake.

In a third embodiment, a gas turbine system includes a turbine configured to output a turbine exhaust flow, a compressor, and an air intake configured to supply a first flow to the compressor. The air intake includes a housing, an air filter configured to filter the first flow, and a discharge air manifold configured to receive a second flow and flow the second flow into the housing. The gas turbine system further includes a recirculation system, having a compressor discharge air line extending from the compressor to the discharge air manifold of the air intake, an ejector disposed along the compressor discharge air line between the compressor and the discharge air manifold, and a control valve disposed along the compressor discharge air line between the ejector and the discharge air manifold. The ejector is configured to receive a compressor discharge air flow from the compressor and the turbine exhaust flow from the turbine to form the second flow and to flow the second flow to the discharge air manifold. The control valve is configured to regulate a flow rate of the second flow.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
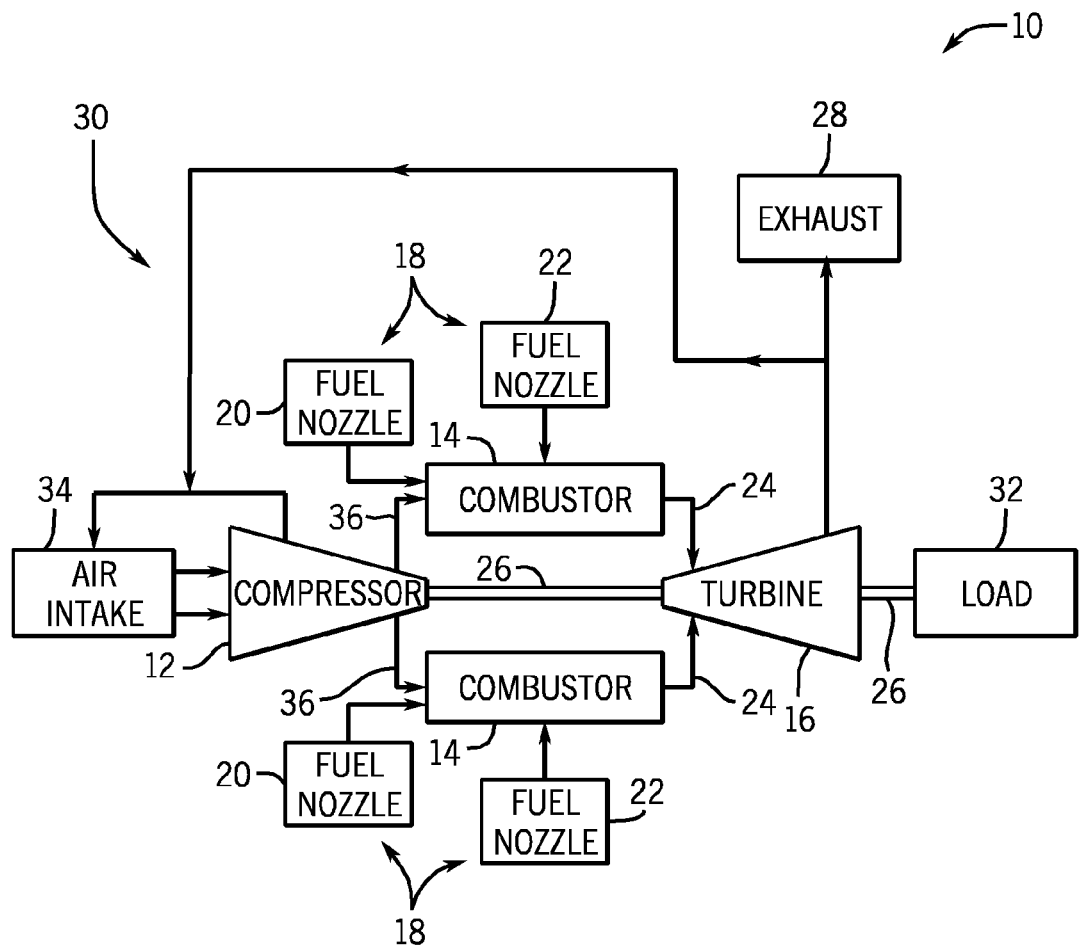
FIG. 1 is a schematic block diagram of an embodiment of a gas turbine system having a recirculation system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include an anti-icing system for a gas turbine system. Specifically, in certain embodiments, the anti-icing system is configured to increase the temperature of air received by a compressor of the gas turbine system. For example, the anti-icing system may include an ejector configured to mix a portion of compressor discharge air (e.g., inlet bleed heat air) with a portion of a turbine exhaust flow (e.g., hot combustion gases), thereby increasing the temperature of the compressor discharge air and enabling a larger percentage of the compressor discharge air to flow into the combustor of the gas turbine system. In other words, the portion of compressor discharge air (e.g., inlet bleed heat air) and the turbine exhaust gas mix within the ejector to form a first mixture, which has a higher temperature than the compressor discharge air alone. Mixing the compressor discharge air with a small portion of the turbine exhaust may increase the temperature of the compressor discharge air, such that less compressor discharge air is used by the recirculation system, thereby allowing a larger percentage of the compressor discharge air to continue to the combustor of the gas turbine system.

The first mixture (e.g., compressor discharge air and turbine exhaust gas mixture) may then be fed into to the air intake system. In this manner, the first mixture may combine with ambient air entering the air intake to form a second mixture. As a result, the second mixture may have a temperature greater than that of the ambient air alone. Thus, when the temperature of the ambient air is within an ice-forming range, combining the ambient air with the first mixture (e.g., compressor discharge air and turbine exhaust gas mixture) to produce increased-temperature mixture (e.g., the second mixture) may prevent, reduce, or substantially inhibit ice formation within the air intake housing, thereby improving reliability of the gas turbine system. Further, as a larger percentage of compressor discharge air may now travel to the combustor of the gas turbine system, the power output of the gas turbine system may increase, thereby improving the efficiency of the gas turbine system.

Turning now to the drawings, FIG. 1 illustrates a block diagram of an embodiment of a gas turbine system 10. The diagram includes a compressor 12, turbine combustors 14, and a turbine 16. The turbine combustors 14 include fuel nozzles 18, which route a liquid fuel and/or gas fuel (e.g., natural gas or syngas) into the turbine combustors 14. As shown, each turbine combustor 14 may have multiple fuel nozzles 18. More specifically, the turbine combustors 14 may each include a primary fuel injection system having primary fuel nozzles 20 and a secondary fuel injection system having secondary fuel nozzles 22.

The turbine combustors 14 ignite and combust an air-fuel mixture to create hot, pressurized combustion gases 24 (e.g., exhaust), which is subsequently directed into the turbine 16. Turbine blades of the turbine 16 are coupled to a shaft 26, which is also coupled to several other components throughout the turbine system 10. As the combustion gases 24 flow against the turbine blades in the turbine 16, the turbine 16 is driven into rotation, which causes the shaft 26 to rotate. Eventually, the combustion gases 24 exit the turbine system 10 via an exhaust outlet 28. In some embodiments, a portion of the exhaust gas 28 may be utilized by a recirculation system 30 to prevent icing at the inlet of the compressor 12, as described in detail below. Further, the shaft 26 may be coupled to a load 32, which is powered via rotation of the shaft 26. For example, the load 32 may be any suitable device that may generate power via the rotational output of the turbine system 10, such as a power generation plant or an external mechanical load. In certain embodiments, the load 32 may include an electrical generator, a propeller of an airplane, and so forth.

In an embodiment of the gas turbine system 10, compressor blades are included as components of the compressor 12. The blades within the compressor 12 are coupled to the shaft 26, and will rotate as the shaft 26 is driven by the turbine 16, as described above. The rotation of the blades within the compressor 12 causes compression of air from an air intake 34, thereby creating pressurized air 36. The pressurized air 36 is then fed into the fuel nozzles 18 of the combustors 14. The fuel nozzles 18 mix the pressurized air 36 and fuel to produce a suitable air-fuel mixture for combustion (e.g., an air-fuel mixture that causes the fuel to more completely burn) so as not to waste fuel or produce excess emissions.

As previously mentioned, the gas turbine system 10 includes the recirculation system 30. The recirculation system 30 is configured to direct compressor discharge air flow (e.g., pressurized air 36) from the compressor 12 and a turbine exhaust flow (e.g., exhaust gas 28) from the turbine 16 to the air intake 34. More specifically, the recirculation system 30 includes an ejector 38 (see FIG. 2) configured to mix the exhaust flow (e.g., exhaust gas 28) with the compressor discharge air (e.g., pressurized air 36) flowing through the recirculation system 30, thereby creating a first mixture, which has a higher temperature than the compressor discharge air (e.g., pressurized air 36) flowing from the compressor 12. Thereafter, the recirculation system 30 may flow the first mixture to the air intake 34, where the first mixture may flow through a manifold and mix with ambient air entering the air intake 34. As a result, the temperature of the ambient air entering the air intake 34 may be increased, and a second mixture may be formed having a temperature greater than that of the ambient air. In this manner, ice formation within the air intake 34 may reduced due to the heat added from the exhaust gas 28.

Figure 2:
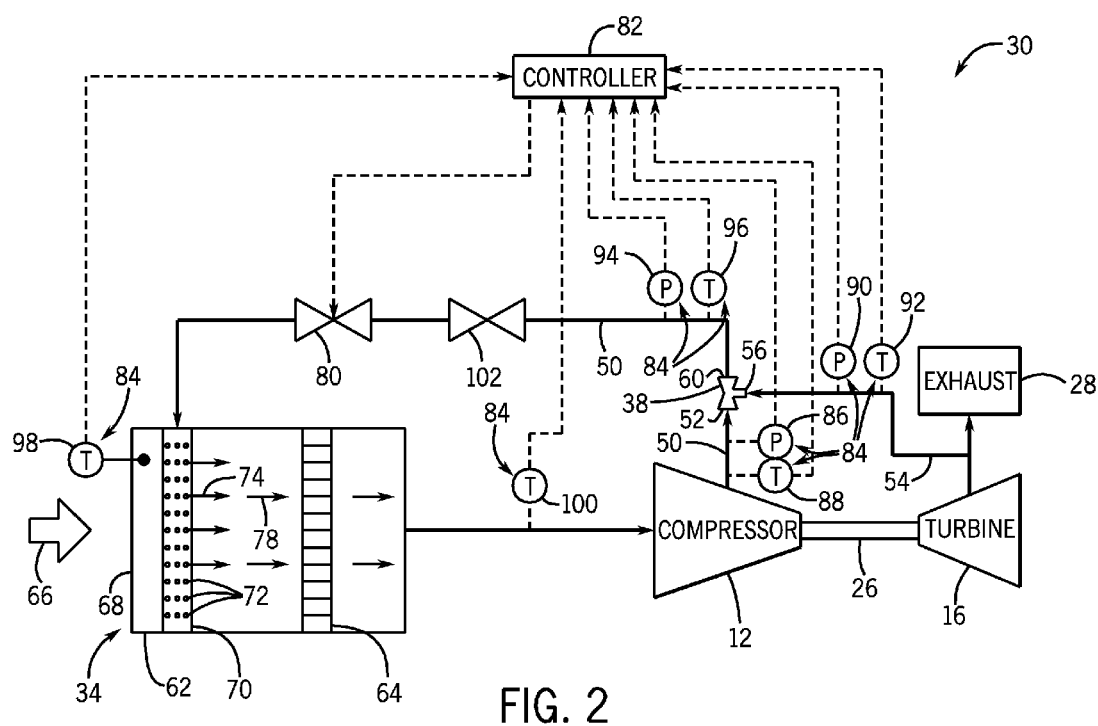
FIG. 2 is a schematic of an embodiment of a recirculation system, which is included in the gas turbine system of FIG. 1.

FIG. 2 is a schematic of an embodiment of the recirculation system 30. As shown, the recirculation system 30 includes a compressor discharge air line 50 (e.g., a compressor discharge air conduit). In the illustrated embodiment, the compressor discharge air line 50 extends from the compressor 12 to a first inlet 52 of the ejector 38 and continues further to the air intake 34. In this manner, the compressor discharge air line 50 directs pressurized air 36 from the compressor 12 to the air intake 34. However, in other embodiments, the compressor discharge air line 50 may flow to other components of the gas turbine system 10 or other systems external to the gas turbine system 10. The pressurized air 36 exiting the compressor 12 through the discharge air line 50 may have an elevated temperature and/or an elevated pressure (e.g., after undergoing compression). For example, in certain embodiments, the pressurized air 36 exiting the compressor 12 through the discharge air line 50 may be approximately 200 to 600° C., 250 to 500° C., or 300 to 400° C. or more. Furthermore, the compressor discharge air (e.g., pressurized air 36) may exit the compressor 12 and flow into the compressor discharge air line 50 from different stages within the compressor 12. As will be appreciated, the pressurized air 36 may have different temperatures and/or pressures depending on the stage of the compressor 12 that the pressurized air 36 exits the compressor 12.

Additionally, a turbine exhaust gas line 54 fluidly connects the exhaust outlet 28 of turbine 16 to a second inlet 56 of the ejector 38. As such, the turbine exhaust gas line 54 directs a portion of the exhaust gas 28 from the turbine 16 to the air intake 34. The exhaust gas 28 exiting the turbine 16 via the turbine exhaust gas line 54 may be approximately 600 to 700° C. or more. The turbine 16 exhaust gas 28 may exit the turbine 16 and flow into the turbine exhaust line 54 from different stages within the turbine 16, thereby resulting in different temperatures and/or pressures of the exhaust gas 28 depending on the stage of the turbine 16 that the exhaust gas 28 exits the turbine 16. As will be appreciated, the addition of the exhaust gas 28 may increase the temperature of the pressurized air 36, resulting in the higher-temperature air mixture (e.g., first mixture) travelling through the compressor discharge air line 50 to the air intake 34. At the air intake 34, the higher-temperature air mixture may increase the temperature of the entering ambient air, forming the air mixture (e.g., second mixture) which enters the compressor 12. In this manner, the temperature of the air entering the compressor may be increased, reducing the possibility of icing.

In the illustrated embodiment, the recirculation system 30 includes the ejector 38 disposed between the compressor 12 and the air intake 34 along the compressor discharge air line 50. As discussed in detail below, the ejector 38 is configured to mix the air flowing from the compressor 12 (e.g., pressurized air 36 flowing through the compressor discharge air line 50) with the exhaust gas 28 from the turbine 16 (e.g., flowing through the turbine exhaust line 54) to form a first mixture 58. The first mixture 58 may leave the ejector 38 via an outlet 60 and flow through the remaining portion of the compressor discharge air line 50 to the air intake 34. As the pressurized air 36 from the compressor (between approximately 800 to 900 kPa, 300 to 400° C.) and the exhaust gas 28 from the turbine 16 (approximately 101 kPa, 600 to 700° C.) are mixed, the compressor discharge air may increase in temperature. In other words, the exhaust gas 28 enters the ejector 38 and mixes with the compressor discharge air (e.g., pressurized air 36) to form the higher temperature first mixture 58, which may exit the ejector 38 via outlet 60. The first mixture 58 may then travel through the remainder of the compressor discharge air line 50 to the air intake 34. In this manner, the temperature of the compressor discharge air (e.g., pressurized air 36), which may be approximately 300 to 400° C. or more when exiting the compressor 12, may be increased (e.g., to a temperature suitable for flowing into the air intake 34). The temperature increase may be between approximately 1 and 100° C., 2 and 50° C., or 5 and 20° C. However the increase in temperature may be dependent on the ratio of exhaust gas 28 to pressurized air 36 used to create the first mixture 58.

As mentioned above, the air intake 34 directs airflow to the compressor 12 for pressurization. In the illustrated embodiment, the air intake 34 includes a housing 62, which has an air filter 64. The air filter 64 is configured to filter debris, particles, and other foreign matter from ambient air 66, which enters the air intake 34 (e.g., the housing 62) through an inlet 68, before the air is directed to the compressor 12. When the ambient air 66 enters the air intake 34, the ambient air 66 may have a temperature between approximately −40 and 10° C., depending on environmental conditions. Without the disclosed embodiments, when the temperature of the ambient air 66 is within the freezing range, condensation from the ambient air 66 or other moisture within the air intake 34 may freeze to form ice within the air intake 34 (e.g., the housing 62) and downstream of the air intake 34 (e.g., at the compressor 12). For example, as the ambient air 66 passes through the air filter 64, water or moisture may separate from the ambient air 66 and subsequently freeze within the air intake 34 without the disclosed embodiments. The air filter 64 may be a static filter or a self-cleaning filter and may be located inside or outside of the housing 62 of the air intake 34.

To reduce the formation of ice within the air intake 34, the recirculation system 30 flows the first mixture 58 into the air intake 34 to provide heat for resisting or removing ice formation. As shown, the recirculation system 30 includes a discharge air manifold 70, which is disposed within the housing 62 of the air intake 34. During operation, the discharge air manifold 70 receives a flow of the first mixture 58 from the compressor discharge air line 50. After the first mixture 58 enters the discharge air manifold 70, the first mixture 58 may subsequently exit the discharge air manifold 70 through multiple apertures 72 formed in the discharge air manifold 70. In other words, the first mixture 58 flowing through the discharge air manifold 70 passes through the apertures 72 and enters the housing 62 of the air intake 34, as indicated by arrows 74. Within the housing 62 of the air intake 34, the air exiting the discharge air manifold 70 (e.g., the first mixture 58) may mix with the ambient air 66 entering the housing 62. This air mixture (referred to below as a second mixture 76), represented by arrows 78, may then pass through the air filter 64 and flow to the compressor 12 for pressurization. While the illustrated embodiment includes one discharge air manifold 70, other embodiments of the recirculation system 30 may include two or more discharge air manifolds 70. For example, the discharge air manifolds 70 may be disposed within the housing 62 in a parallel configuration, cross-wise configuration, and so forth. As mentioned above, the air flowing from the compressor 12 and the exhaust gas 28 through the compressor discharge air line 50 may have an elevated temperature (e.g., between approximately 305 and 500° C., 310 and 450° C., or 320 and 420° C.). As a result, the second mixture 76 (e.g., ambient air 66 mixed with the first mixture 58) may have a higher temperature than the ambient air 66 entering the housing 62. The increase in temperature may be at least 5, 10, 15, 20, 30, 40, or 50° C. from the temperature of the ambient air 66. The temperature increase of the ambient air 66 may aid in reducing the formation of ice within the air intake 34, thereby improving the operability and reliability of the turbine system 10, even in cold conditions.

As will be appreciated, certain embodiments of the air intake 34 may be configured to supply an air flow (e.g., the second mixture 76) above a certain temperature, flow rate, and/or pressure threshold. As such, the recirculation system 30 may include a control valve 80 disposed along the compressor discharge air line 50. Specifically, the control valve 80 is located along the compressor discharge air line 50 downstream of the ejector 38, i.e., between the ejector 38 and the discharge air manifold 70. The control valve 80 may be configured to regulate flow of the first mixture 58 through the compressor discharge air line 50 to ensure an adequate temperature increase is applied to the ambient air 66 to reduce ice formation within the air intake 34. For example, in certain embodiments, the control valve 80 may have discrete open and closed positions, thereby allowing flow of the first mixture 58 through the compressor discharge air line 50 or blocking flow of the first mixture 58 through the compressor discharge air line 50. In other embodiments, the control valve 80 may have variable positions, enabling the control valve 80 to regulate various flow rates of the first mixture 58 to the air intake 34.

Furthermore, the operation of the control valve 80 may be regulated by a controller 82. For example, the controller 82 may incorporate a processor and memory to regulate whether the control valve 80 is in an open or closed position. Additionally, in some embodiments, the controller 82 may regulate the operation of the control valve 80 based on feedback from various sensors 84 of the recirculation system 30. For example, the recirculation system 30 may include a pressure sensor 86 and a temperature sensor 88 configured to measure a pressure and temperature, respectively, of the compressor discharge air (e.g., pressurized air 36) exiting the compressor 12 and flowing through the compressor discharge air line 50. Similarly, the recirculation system 30 may include a pressure sensor 90 and a temperature sensor 92 configured to measure a pressure and temperature, respectively, of the turbine 16 exhaust gas 28 flowing through the turbine exhaust gas line 54. Further, a pressure sensor 94 and a temperature sensor 96 may be included to measure a pressure and temperature, respectively, of the compressor discharge air and exhaust gas 28 mixture (e.g., the first mixture 58) exiting the ejector 38. As such, the pressure sensor 94 and the temperature sensor 96 may measure a pressure and temperature, respectively, of the first mixture 58 entering the discharge air manifold 70 within the housing 62 of the air intake 34.

Furthermore, the recirculation system 30 may include additional temperature sensors 98 and 100 configured to measure temperatures of the ambient air 66 and of the air entering the compressor 12 (e.g., the second mixture 76), respectively. However, in other embodiments fewer or additional sensors may be used, as determined by implementation-specific parameters. As described below, feedback from the sensors 84 may be used by the controller 82 to regulate operation of the control valve 80.

As mentioned above, the first mixture 58 (e.g., from the outlet 60 of the ejector 38) enters the air intake 34 through the discharge air manifold 70 and mixes with the ambient air 66 entering the housing 62 through the inlet 68. In this manner, the second mixture 76 is formed, which may have a higher temperature than the ambient air 66. The temperature of the second mixture 76 may be measured by the temperature sensor 100 as the second mixture 76 flows from the air intake 34 to the compressor 12. In one embodiment of the recirculation system 30, the controller 82 may be configured to operate the control valve 80 based, at least in part, on feedback from the temperature sensor 100. That is, the controller 82 may regulate operation of the control valve 80, thereby regulating the flow of the first mixture 58 (e.g., pressurized air 36 and exhaust gas 28) through the compressor discharge air line 50, to obtain a target temperature of the second mixture 76 formed within the housing 62 of the air intake 34. Details of flow through the ejector 38 will be described below, with respect to FIG. 3. In certain embodiments, the target temperature of the second mixture 76 (e.g., measured by the temperature sensor 100) may be approximately 5, 10, 15, 20, 30, 40, or 50° C. greater than a temperature of the ambient air 66 measured by the temperature sensor 98. In other words, the recirculation system 30 may be configured to increase the temperature of the ambient air 66 by a desired amount when producing the second mixture 76.

In one embodiment, when the temperature of the second mixture 76 measured by the temperature sensor 100 is below a target or desired temperature, the controller 80 may gradually or immediately open the control valve 80. As a result, the flow rate of the first mixture 58 may increase. That is, the flow rate of the pressurized air 36 through the compressor discharge air line 50 and/or the flow rate of the exhaust gas 28 through the turbine exhaust gas line 54 may increase. As the flow of compressor discharge air (e.g., pressurized air 36) into the ejector 38 increases, the amount of exhaust gas 28 flowing into the ejector 38 may also increase, as discussed below. Therefore, the flow rate of the first mixture 58, formed within of the ejector 38, may increase, and the discharge air manifold 70 may provide more of the first mixture 58 into the air intake 34. The increase in the amount of the first mixture 58 flowing into the housing 62 may result in an increase in temperature of the second mixture 76 formed within the housing 62.

Conversely, if the temperature of the second mixture 76 measured by the temperature sensor 100 is above a desired or target temperature, the controller 82 may gradually or immediately close the control valve 80. As a result, the flow rate of the first mixture 58 may decrease. That is, the flow rate of compressor discharge air through the compressor discharge air line 50 may decrease, thereby decreasing the flow of compressor discharge air through the ejector 38. It may be desirable to limit the amount of pressurized air 36 bled from the compressor 12 in order to maintain the power output and/or efficiency of the gas turbine system 10.

Furthermore, while the embodiments described above include the use of feedback from the temperature sensor 100 by the controller 82, other embodiments of the controller 82 may use feedback from other sensors 84 and/or additional sensors 84 in the recirculation system 30. For example, the controller 82 may utilize feedback from the temperature sensors 88, 92, 96, and/or 98 and the pressure sensors 86, 90, and/or 94 in regulating the operation of the control valve 80. As will be appreciated, the feedback from the other various sensors 84 in the recirculation system 30 may be used by the system 30 to help produce the first air mixture 58 and/or the second mixture 76 at desired temperatures and/or pressures suitable for ice prevention and/or ice removal.

In addition to the control valve 80, the recirculation system 30 may include a manual valve 102. The manual valve 102 may be open during normal operation of the gas turbine system 10. However, when the gas turbine system 10 is not in operation, the manual valve 102 may be closed. As such, the manual valve 102 may block any flow within the recirculation system 30 in the event that the turbine 16 is shut down.

Figure 3:
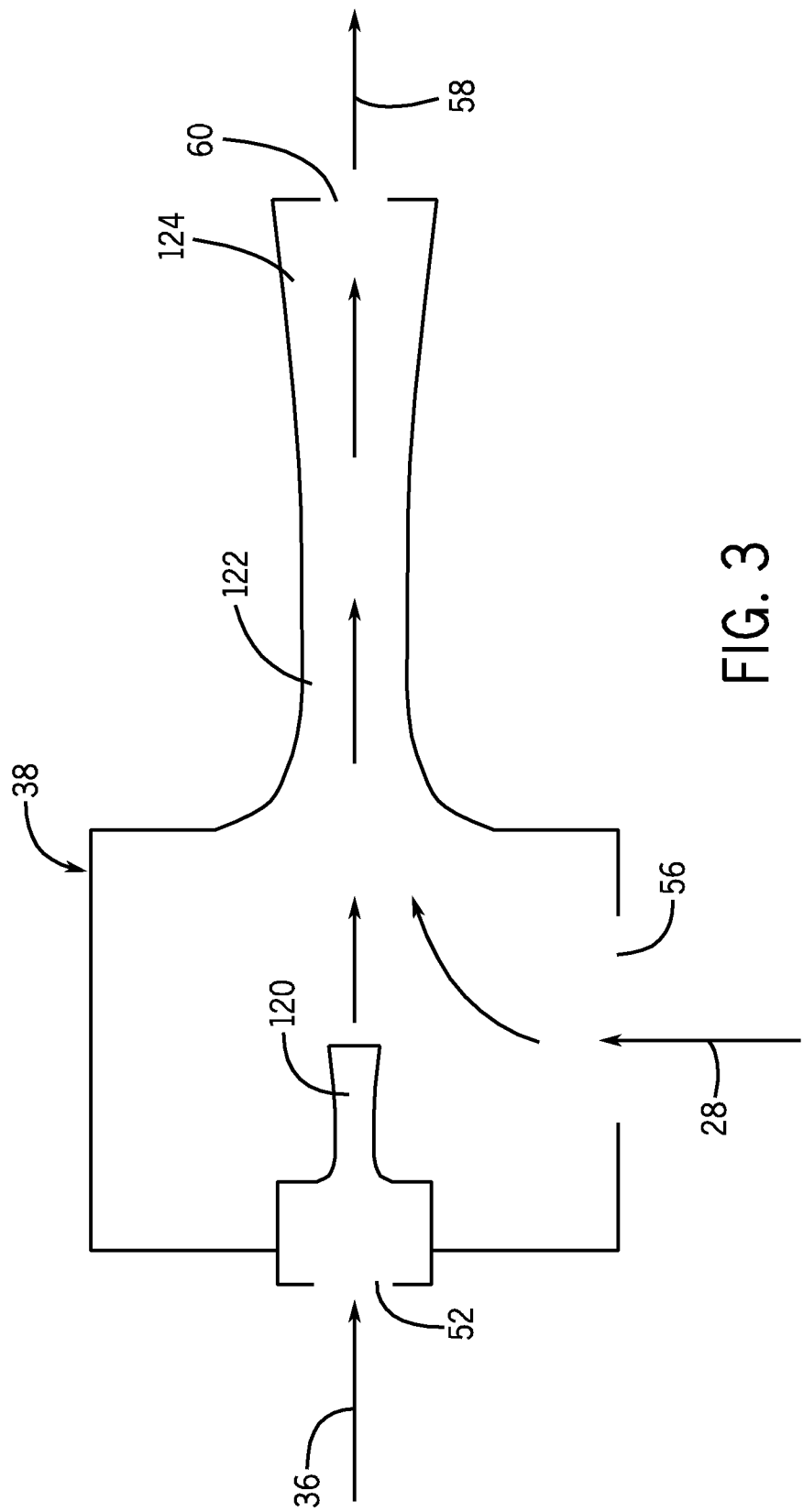
FIG. 3 is a cross-sectional side view of an ejector, which may be included in the recirculation system of FIG. 2.

FIG. 3 is a cross-sectional side view of an embodiment of the ejector 38, which may be included in the recirculation system 30. As discussed, the ejector 38 is configured to receive a flow of the compressor discharge air (e.g., pressurized air 36) and mix the compressor discharge air with a portion of the exhaust gas 28 from the turbine 16. As shown, the pressurized air 36 enters the ejector 38 through the first inlet 52 and flows through a nozzle portion 120 (e.g., a converging conduit or section) of the ejector 38. As such, the pressurized air 36 may act as a motive fluid within the ejector 38. The motive fluid may provide a majority of the mass flow through the ejector 38, and the velocity of the motive fluid (e.g., pressurized air 36) may increase as the motive fluid flows through the nozzle portion 120. This increased velocity may generate a suction force at the second inlet 56 when an adequate outlet 60 pressure is maintained. In certain embodiments, an adequate outlet 60 pressure may be between approximately 320 and 420 kPa.

The suction force within the ejector 38 draws a flow of exhaust gas 28 from the turbine 16 into the second inlet 56. As will be appreciated, the flow of exhaust gas 28 may be smaller relative to the flow of pressurized air 36. Further, the suction force may enable mixing of the exhaust gas 28 with the pressurized air 36 within an annular portion 122, resulting in formation of the first mixture 58. Thereafter, the first mixture 58 continues through a diffuser portion 124 (e.g., a diverging conduit or section) of the ejector 38 and flows from the ejector 38 into the compressor discharge air line 50 through the outlet 60. As will be appreciated, the ejector 38 may operate without a motor, fan, or other powered mechanical device, which may help reduce the cost and/or complexity of the recirculation system 30. Additionally, while the illustrated embodiment of the ejector 38 includes an annular passage 122 configured to receive the exhaust gas 28, other embodiments of the ejector 38 may have other configurations or passages to receive the exhaust gas 28.

As mentioned above, when the portion of the exhaust gas 28 flows into the ejector 38, the exhaust gas 28 increases the temperature of the compressor discharge air (e.g., pressurized air 36) to form the first mixture 58. Consequently, the first mixture 58 may have a higher temperature than the compressor discharge air (e.g., pressurized air 36) that enters the ejector 38. In certain embodiments, the increased temperature of the first mixture 58, provided by heat from the exhaust gas 28, may enable less pressurized air 36 to be used for anti-icing purposes, resulting in increased flow of pressurized air 36 directed to the combustor 14 of the gas turbine system 10. As will be appreciated, increasing the amount of air (e.g., pressurized air 36) sent to the combustor 14 may increase power output and improve efficiency of the gas turbine system 10. Further, although described with respect to anti-icing purposes, the above described system may be applied to increase gas turbine system 10 base load efficiency and/or increase gas turbine system 10 turndown capability.

As discussed in detail above, the disclosed embodiments include the recirculation system 30 for the gas turbine system 10. Specifically, the recirculation system 30 may provide anti-icing benefits by increasing the temperature of the air (e.g., the second mixture 76) supplied to the compressor 12 of the gas turbine system 10. For example, the recirculation system 30 may include the ejector 38 configured to mix compressor discharge air (e.g., pressurized air 36) with exhaust gas 28 from the turbine 16, thereby increasing the temperature of the compressor discharge air (e.g., pressurized air 36) to form the first mixture 58. The first mixture 58 is directed toward the discharge air manifold 70 within the housing 62 of the air intake 34 of the gas turbine system 10. In this manner, the first mixture 58 may mix with ambient air 66 entering the inlet 68 of the housing 62 to form the second mixture 76. The temperature of the second mixture 76 may be greater than the temperature of the ambient air 66 entering the housing 62 of the air intake 34, thereby inhibiting or removing ice formation within the housing 62 of the air intake 34 or elsewhere within the turbine system 10. Thereafter, the second mixture 76 may be supplied to the compressor 12 of the gas turbine system 10 for compression. The recirculation system 30 may include control aspects such as a control valve 80 operated via a controller 82 to balance the amount of pressurized air 36 (bled from the compressor 12) with the desired temperature increase applied to the ambient air 66 to inhibit or remove icing. Accordingly, adding exhaust gas 28 from the turbine 16 to the compressor discharge air line 50 may maintain or improve the power output and efficiency of the gas turbine system 10, while further increasing reliability by reducing ice formation within the air inlet 34.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising: a recirculation system, comprising:
a compressor discharge air line configured to extend between an air intake and a compressor downstream of the air intake, wherein the air intake is configured to intake ambient air prior to compression; and
an ejector disposed along the compressor discharge air line between the compressor and the air intake, wherein the ejector is configured to receive a compressor discharge air flow from the compressor and a turbine exhaust flow from a turbine to form a first mixture, and the ejector is configured to flow the first mixture to an air filter of the air intake.

2. The system of claim 1, wherein the air intake comprises a discharge air manifold, and the discharge air manifold is configured to receive the first mixture from the compressor discharge air line.

3. The system of claim 2, wherein the discharge air manifold comprises a conduit with apertures, and the apertures are configured to flow the first mixture into the air intake.

4. The system of claim 1, wherein the air intake is configured to mix the first mixture and the ambient air to form a second mixture.

5. The system of claim 4, wherein the air intake is configured to supply the second mixture to the compressor.

6. The system of claim 4, wherein the air intake comprises a housing and the air filter configured to filter the second mixture supplied to the compressor.

7. The system of claim 1, comprising a control valve disposed along the compressor discharge air line between the ejector and the air intake.

8. The system of claim 1, comprising a control valve configured to regulate a flow rate of the first mixture through the compressor discharge air line to maintain a temperature in the air intake above a threshold temperature to inhibit or remove ice formation.

9. The system of claim 8, comprising a controller configured to operate the control valve based on feedback from at least one sensor of the recirculation system to maintain the temperature in the air intake above the threshold temperature to inhibit or remove ice formation.

10. The system of claim 9, wherein the at least one sensor comprises a first temperature sensor configured to measure a first temperature of the first mixture, a first pressure sensor configured to measure a first pressure of the first mixture, a second temperature sensor configured to measure a second temperature of the compressor discharge air flow, a second pressure sensor configured to measure a second pressure of the compressor discharge air flow, a third temperature sensor configured to measure a third temperature of the turbine exhaust flow, a third pressure sensor configured to measure a third pressure of the turbine exhaust flow, or a fourth temperature sensor configured to measure a fourth temperature of a second mixture supplied to the compressor by the air intake, wherein the second mixture comprises the ambient air mixed with the first mixture.

11. The system of claim 1, comprising a gas turbine system having the recirculation system, the compressor, a combustor, and the turbine.

12. The system of claim 1, wherein the compressor discharge air line is configured to provide the first mixture to the air intake upstream of the air filter, the air intake is configured to mix the first mixture with the ambient air to form a second mixture, the air filter is configured to filter the second mixture, and the air intake is configured to supply the second mixture to the compressor.

13. The system of claim 12, comprising an anti-icing system having the recirculation system configured to maintain a temperature in the air intake above a threshold temperature to inhibit or remove ice formation.

14. A system, comprising:
a gas turbine system, comprising:
an air intake comprising a housing and a filter, wherein the air intake is configured to intake ambient air prior to compression;
a compressor downstream from the air intake;

a combustor downstream from the compressor;

a turbine downstream from the combustor, wherein the turbine is configured to output a turbine exhaust flow;

a recirculation system, comprising:

a compressor discharge air line extending from the compressor to the air intake;

an ejector disposed along the compressor discharge air line between the compressor and the air intake, wherein the ejector is configured to receive and mix a compressor discharge air flow from the compressor and the turbine exhaust flow from the turbine to form a first mixture, and the ejector is configured to flow the first mixture to the air intake.

15. The system of claim 14, wherein the air intake comprises a discharge air manifold configured to receive and flow the first mixture into the housing to mix with the ambient air to form a second mixture, and the compressor is configured to receive the second mixture from the air intake.

16. The system of claim 15, wherein the filter is disposed downstream from the discharge air manifold.

17. The system of claim 14, wherein the recirculation system comprises a control valve disposed along the compressor discharge air line between the ejector and the discharge air manifold, and the control valve is configured to regulate a flow rate of the first mixture.

18. The system of claim 17, comprising a controller configured to regulate the operation of the control valve based on feedback from at least one temperature sensor, and the controller is configured to maintain a temperature in the air intake above a threshold temperature to inhibit or remove ice formation.

19. A gas turbine system, comprising:

an air intake comprising a housing, a filter, and a discharge air manifold, wherein the air intake is configured to intake ambient air prior to compression;

a compressor downstream from the air intake;

a turbine configured to output a turbine exhaust flow; and a recirculation system, comprising:

a compressor discharge air line extending from the compressor to the discharge air manifold of the air intake;

an ejector disposed along the compressor discharge air line between the compressor and the discharge air manifold, wherein the ejector is configured to receive a compressor discharge air flow from the compressor and the turbine exhaust flow from the turbine to form a first mixture, and the ejector is configured to flow the first mixture to the discharge air manifold; and a control valve disposed along the compressor discharge air line between the ejector and the discharge air manifold, wherein the control valve is configured to regulate a flow rate of the first mixture.

20. The system of claim 19, wherein the air intake is configured to mix the ambient air with the first mixture to form a second mixture, and the compressor is configured to receive the second mixture from the air intake.

21. The system of claim 20, wherein the recirculation system comprises a plurality of sensors, wherein the plurality of sensors comprises a first temperature sensor configured to measure a first temperature of the compressor discharge air flow, a first pressure sensor configured to measure a first pressure of the compressor discharge air flow, a second temperature sensor configured to measure a second temperature of the turbine exhaust flow, a second pressure sensor configured to measure a second pressure of the turbine exhaust flow, a third temperature sensor configured to measure a third temperature of the first mixture, a third pressure sensor configured to measure a third pressure of the first mixture, a fourth temperature sensor configured to measure a fourth temperature of the second mixture supplied to the compressor by the air intake, a fifth temperature sensor configured to measure a fifth temperature of the ambient air, or any combination thereof.

22. The system of claim 21, wherein the recirculation system comprises a controller configured to operate the control valve based on feedback from at least one of the plurality of sensors.

23. The system of claim 19, wherein the compressor discharge air line is configured to provide the first mixture to the discharge air manifold, the discharge air manifold is configured to flow the first mixture into the housing, the housing is configured to mix the first mixture with the ambient air to form a second mixture, the filter is configured to filter the second mixture, and the air intake is configured to supply the second mixture to the compressor.

24. The system of claim 19, wherein the gas turbine system comprises an anti-icing system having the recirculation system configured to maintain a temperature in the air intake above a threshold temperature to inhibit or remove ice formation.

* * * * *